(12) United States Patent
Carpenter

(10) Patent No.: US 11,178,461 B2
(45) Date of Patent: *Nov. 16, 2021

(54) ASYNCHRONOUS VIDEO CONVERSATION SYSTEMS AND METHODS

(71) Applicant: Carl Carpenter, Ventura, CA (US)

(72) Inventor: Carl Carpenter, Ventura, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/451,355

(22) Filed: Jun. 25, 2019

(65) Prior Publication Data

US 2019/0313156 A1 Oct. 10, 2019

Related U.S. Application Data

(63) Continuation of application No. 15/938,794, filed on Mar. 28, 2018.

(51) Int. Cl.
*H04N 21/4788* (2011.01)
*H04L 12/58* (2006.01)
*H04N 5/91* (2006.01)
*H04N 21/433* (2011.01)
*H04N 21/2743* (2011.01)
(Continued)

(52) U.S. Cl.
CPC ......... *H04N 21/4788* (2013.01); *H04L 51/10* (2013.01); *H04L 51/16* (2013.01); *H04N 5/91* (2013.01); *H04N 21/2743* (2013.01); *H04N 21/4312* (2013.01); *H04N 21/4334* (2013.01); *H04N 21/4667* (2013.01);
(Continued)

(58) Field of Classification Search
CPC ........... H04N 21/4788; H04N 21/2743; H04N 21/4312; H04N 21/4334; H04N 21/4667; H04N 21/4756; H04N 21/4825; H04N 21/6547; H04N 21/854; H04N 5/91; H04L 51/10; H04L 51/16
See application file for complete search history.

(56) References Cited

U.S. PATENT DOCUMENTS

2008/0184122 A1 7/2008 Grant et al.
2009/0271283 A1* 10/2009 Fosnacht .............. G06Q 20/123
705/26.1
(Continued)

OTHER PUBLICATIONS

Johnson, Scott, "What do all the YouTube buttons mean?", The Computer Tutor, https://computertutorflorida.com/2012/04/what-do-the-youtube-buttons-mean/, Apr. 9, 2012, pp. 1-6. (Year: 2012).*

*Primary Examiner* — Jefferey F Harold
*Assistant Examiner* — Alexander Boyd
(74) *Attorney, Agent, or Firm* — Select Patents; Ashkon Cyrus

(57) ABSTRACT

A distributed network for producing consensus, featuring methods comprising: playing, by an Exchange Player, a set of individual speaker videos created by an Exchange Recorder, wherein the set of individual speaker videos comprise an Exchange between a plurality of speakers; displaying, by a user interface of the Exchange Player, replies to the current speaker video as a vertical list of thumbnails overlaying a side of the Exchange Player user interface; and providing, by a user interface of the Exchange Player, the ability for users to rate speaker videos to indicate their level of agreement with the speakers, and for their ratings to be used to measure audience consensus with speaker videos at various levels, including post, thread, and conversation.

1 Claim, 7 Drawing Sheets

(51) Int. Cl.
*H04N 21/854* (2011.01)
*H04N 21/475* (2011.01)
*H04N 21/482* (2011.01)
*H04N 21/466* (2011.01)
*H04N 21/6547* (2011.01)
*H04N 21/431* (2011.01)

(52) U.S. Cl.
CPC ..... *H04N 21/4756* (2013.01); *H04N 21/4825* (2013.01); *H04N 21/6547* (2013.01); *H04N 21/854* (2013.01)

(56) References Cited

U.S. PATENT DOCUMENTS

| | | |
|---|---|---|
| 2016/0188633 A1 | 6/2016 | Wang et al. |
| 2017/0039867 A1* | 2/2017 | Fieldman ............. H04N 21/854 |
| 2017/0353414 A1* | 12/2017 | Ertmann ................. H04L 51/32 |
| 2018/0048599 A1* | 2/2018 | Arghandiwal .......... H04L 51/16 |

* cited by examiner

ASYNCHRONOUS VIDEO CONVERSATION SYSTEMS AND METHODS

CROSS REFERENCE TO RELATED APPLICATIONS

This application is a continuation of U.S. patent application Ser. No. 15,938,794, filed on Mar. 28, 2018, the entirety of which is incorporated by reference.

FIELD OF THE INVENTION

The present invention is in the technical field of electronic communications. More particularly, the present invention is in the technical field of video media.

BACKGROUND OF THE INVENTION

Current systems of video communication are predominantly synchronous and therefore serial, meaning the participants in a conversation are in the same moment of time and only one person at a time can speak.

This necessitates moderation and produces results that may not reflect the will and intent of the participants. Interruption, turn-taking, speaking over each other, anxiety, and missed opportunities to speak are frustrating for speakers and audience alike.

This is especially true of video conversations at scale, such as TV news talk shows, which frequently are either highly partisan or become shouting matches, and wherein there is no way for audience members to get involved at all, much less evolve the conversation toward consensus.

Consequently, there exists a need for scalable video conversation delivered through a distributed, decentralized, open and transparent system, one that features methods making direct expression possible without the need for intermediaries, and one that supports rich feedback from the audience, feedback which can be used to produce measurable consensus.

SUMMARY OF THE INVENTION

This Summary is intended to introduce key points of novelty in a simplified form that are further described below in the Detailed Description. Various embodiments of the present disclosure enable a video conversation experience similar to that of a TV talk show, but one that permits the exchange of short video messages in an asynchronous manner. This group video conversation is scalable to include a mass audience, thereby giving rise to collective conversations capable of producing measurable consensus on a plurality of focused subjects. Groups may be organizations, municipalities, states, regions, nations, or the entire planet.

The system provides a video conversation player and a video conversation recorder, referred to hereafter as the Exchange Player and Exchange Recorder, respectively, the combination of which, in at least some embodiments, enables video messages (i.e., posts) to be recorded and a system of conversations, threads, and exchanges of these posts to be provided. The system further provides a means and method for video posts from the audience to be queued and sorted for inclusion into the conversation.

Each conversation comprises a number of threads, each having its own Panel of experts and consisting of a series of Exchanges. An exchange, as defined in the present disclosure, is a novel unit of media playable by the Exchange Player, as disclosed in this application. It can be appreciated that such a system provides the ability for audience members to rate and thereby indicate their level of agreement with individual video posts made by the expert panelists discussing and debating in a marketplace of ideas. In this way the will of the user community can emerge and be implemented directly.

The asynchronous nature of the system offers many advantages to users, such as the ability to speak whenever they are inspired and say exactly what they intend to say; that is, the system allows users to re-record their posts until they achieve the desired message.

BRIEF DESCRIPTION OF THE DRAWINGS

The detailed description below refers to the accompanying figures. The use of the same reference numbers in different instances in the description and the figures may indicate similar or identical items.

DETAILED DESCRIPTION OF THE INVENTION

Various embodiments enable a video conversation experience similar to that of a TV talk show but featuring the exchange of short video posts in an asynchronous manner. The short video posts can have any suitable length, from 10 seconds to 3 minutes or more.

The present disclosure provides a system comprising a massively scalable set of individual player/recorders such that when these players and recorders interact they form a distributed system that produces measurable consensus.

That is, the player/recorder presently disclosed provides a means for facilitating a scalable group conversation that ultimately produces measurable consensus, which can be defined as a specific level of collective audience agreement with a speaker's post.

Figure 1:
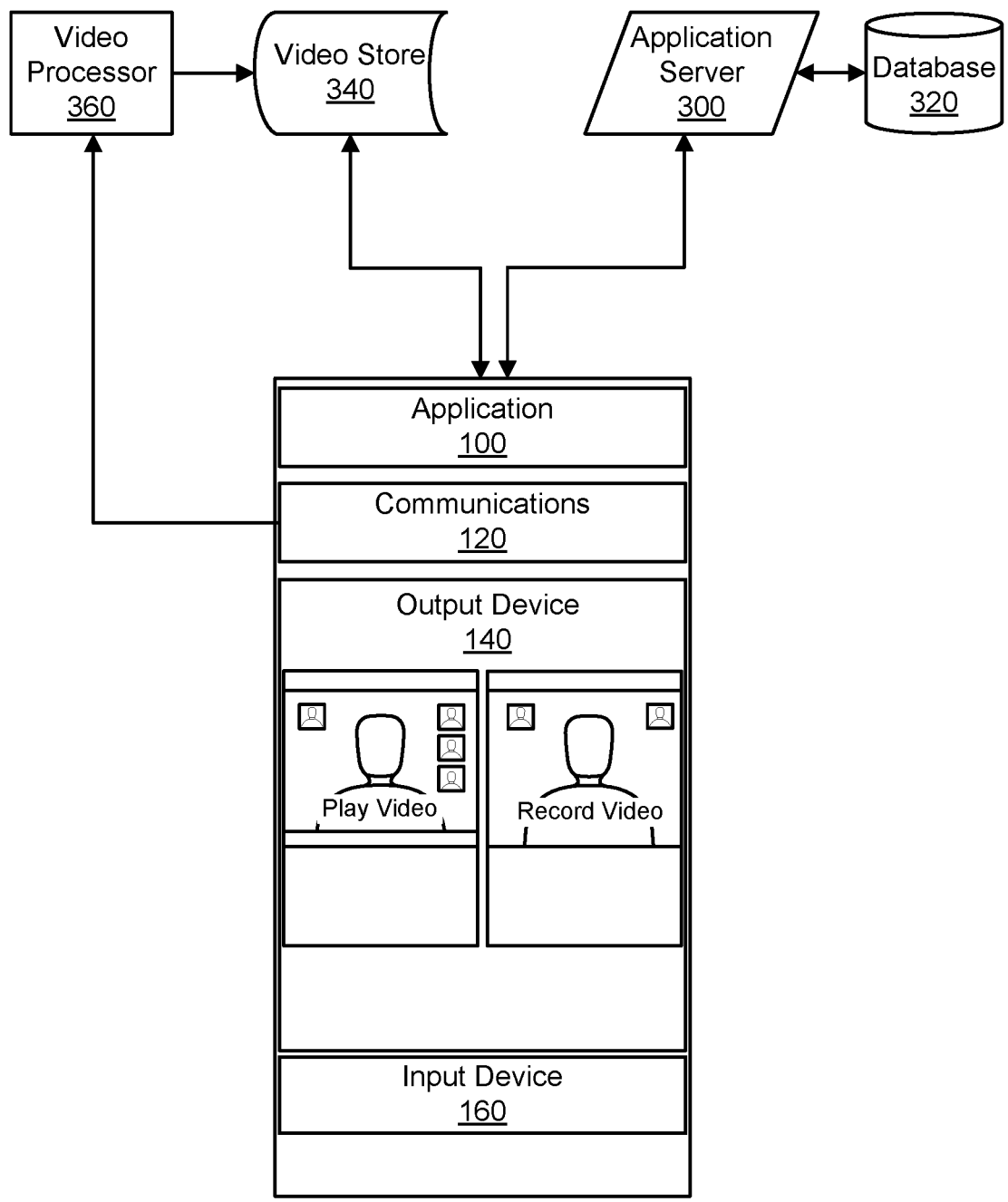
FIG. 1 is a block diagram of an example system supporting an asynchronous video conversation experience.

Referring now to the invention in more detail, FIG. 1 discloses a client device, capable of playing, recording and transmitting video files, connected to a set of special purpose servers supporting a communications environment facilitating the video conversation experience. Example client devices include, but are not limited to, smart phones, laptop computers, tablet computers, desktop computers, portable gaming devices, portable media players, e-book readers, and televisions.

In the embodiment illustrated in FIG. 1, Client Application 100 communicates with Application Server 300 across Communication Channel 310 via Communications Channel 120 to provide the video conversation user interface. The Communications Channel 120 typically includes an Internet or mobile communication connection between Client Application 100 and Application Server 300, but could be established by other means such as closed networks, private networks, etc. Application Server 300 often comprises multiple physical servers in order to host the application at scale. In one embodiment, the multiple servers interact behind a load balancer, adding servers as needed to scale horizontally. In alternative embodiments, each server can be a physically separate machine or it can be different processes running within the same physical machine. In one embodiment, Application Server 300 is connected to Database 320, implemented by an object-relational database management system such as PostgreSQL maintained by a service provider, in order to facilitate communication and interaction among the users of the Client devices.

In a further embodiment, Database 320 and Video Processor 360 are all running on at least one remotely hosted cloud application server system. For example, Video Processor 360 may be running an Express web server supporting Socket.io on a Digital Ocean droplet.

The video conversation user experience provided by the present disclosure is modeled after the TV talk show, wherein a host and a panel of experts carry on a conversation in front of an interactive audience. This is accomplished by providing a video conversation Player and Recorder that, when used by the individuals in a group focused upon a particular issue, facilitate scalable group conversation and debate that evolves toward and ends in measurable consensus.

Figure 2:
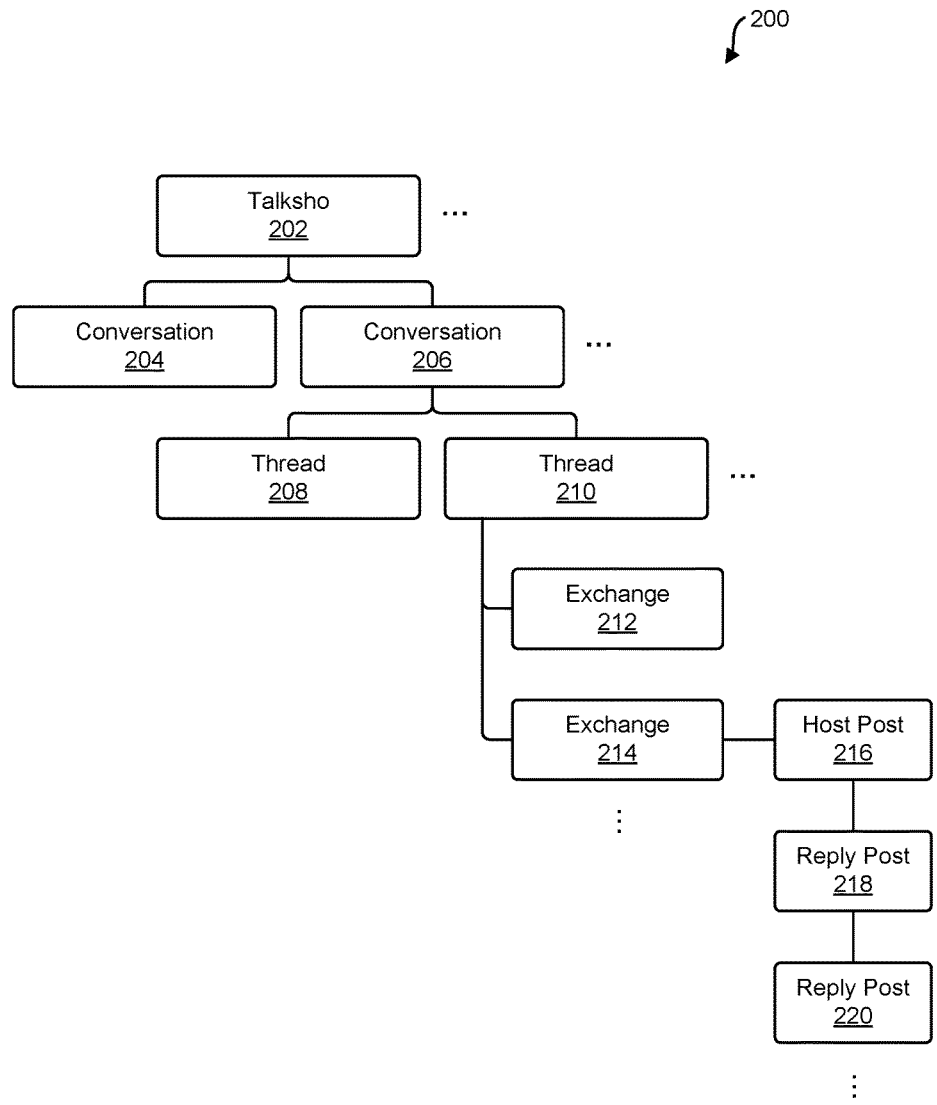
FIG. 2 is a block diagram of the structure of the video conversation experience.

FIG. 2 is a block diagram describing the structure and organization of the video conversation experience 202. Because the system is asynchronous, multiple conversations can take place simultaneously, with each conversation (such as conversation 204 and 206) comprising a plurality of threads. In this example, Conversation 206 is comprised of thread 208 and thread 210. Each thread has its own panel of experts producing a series of exchanges between a panelist playing the role of host and the other panelists. In this example, thread 210 contains exchange 212 and exchange 214.

Video posts are grouped via binding into a new unit of media called an exchange (such as Exchange 212 and Exchange 214), consisting of a host post and a set of reply posts. For example, Exchange 214 consists of host post 216 and reply posts 218 and 220. The host post is the originating video for an exchange. Each host post can have multiple replies, and each reply can have its own replies.

Figure 4:
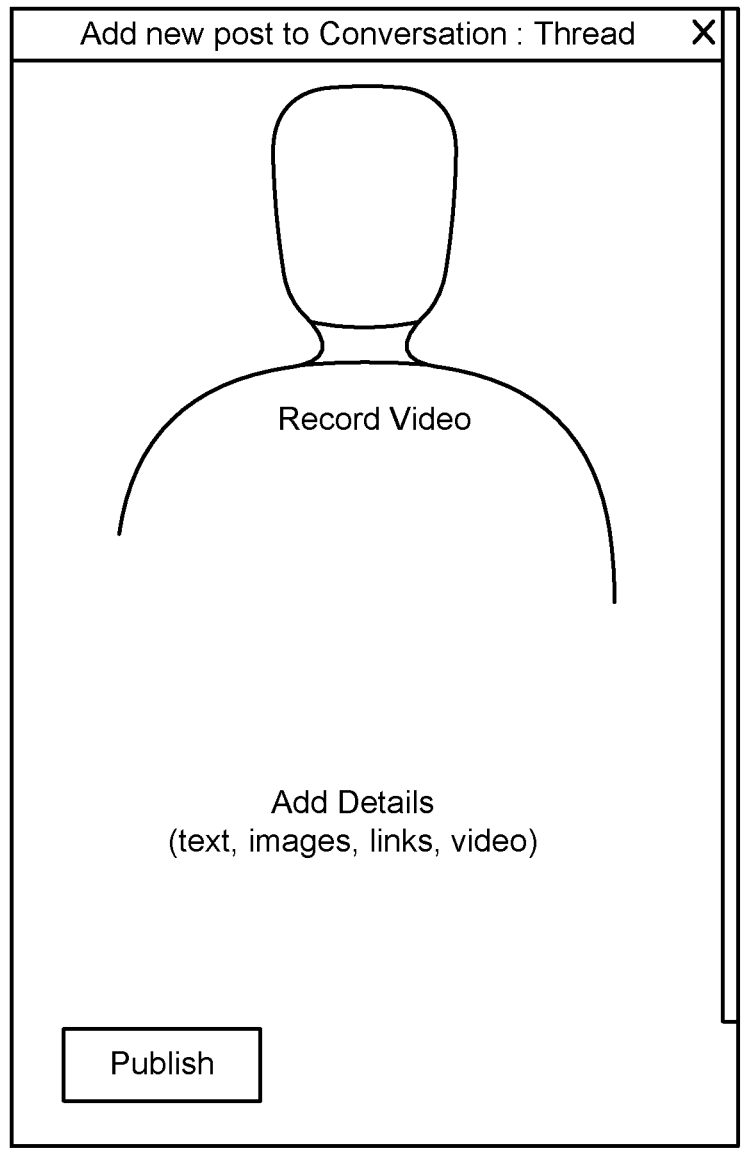
FIG. 4 is a Main Exchange Recorder according to an embodiment.
Figure 5:
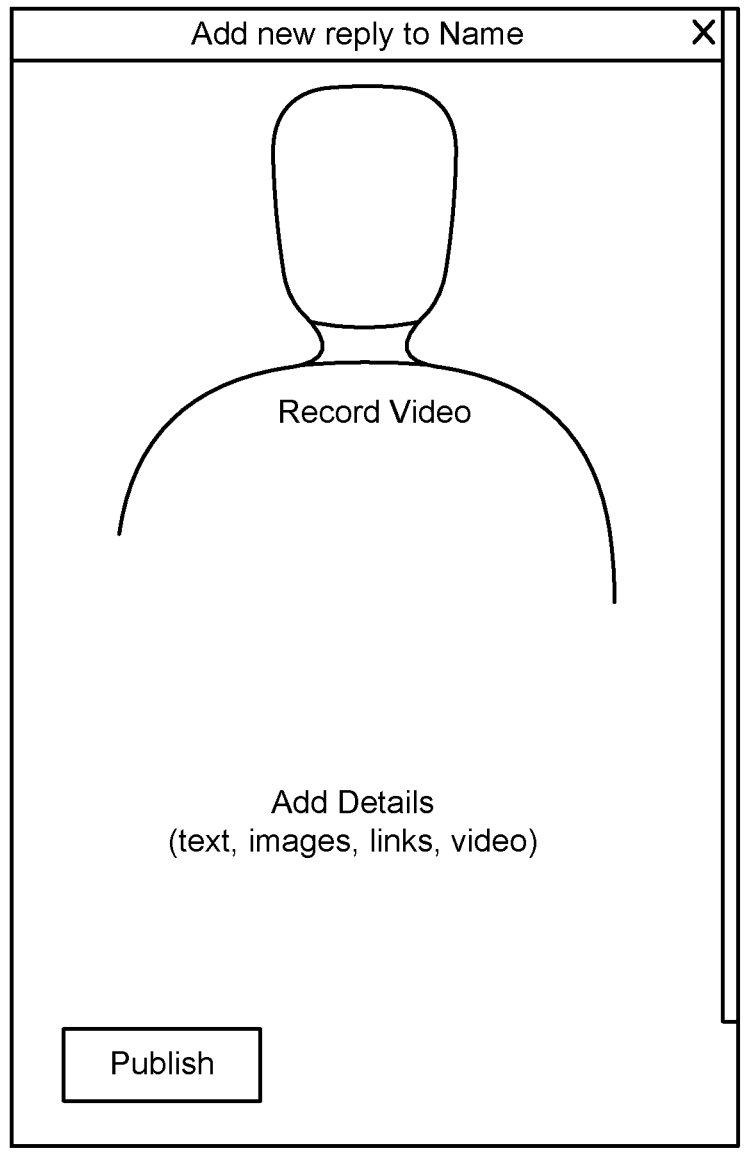
FIG. 5 is an Embed Exchange Recorder according to an embodiment.

The video conversation experience is provided by Client Application 100 displaying GUI 145 on Output Device 140. GUI 145 consists of an Exchange Player 380, illustrated in FIG. 3, and an Exchange Recorder, the two principle variants of which are illustrated in FIG. 4 and FIG. 5. By means of GUI 145, and making use of Input Device 160 (which could include cameras, microphones, keyboards, and other known input means), the user is capable of playing videos stored on Video Store 340 across Communications Channel 350 mediated by Communications 120. Video Processor 360 provides videos to Video Store 340. Similarly, the user is capable of recording videos by means of GUI 145 utilizing Video Processor 360 mediated by Communication 120 across Communications Channel 370.

The system classifies users as panelists (i.e., expert speakers) and audience members. While it is panelists who primarily record and publish videos, with audience members consuming them, audience members can also become speakers if and when they choose to record and publish video replies. Both panelist and audience videos can be recorded and played via a standalone implementation of GUI 145 as the first embodiment of Client Application 100, hereafter referred to as the Main embodiment, or from an implementation embedded in a text-based article or post produced by a third party content management system (e.g., WordPress) as the second embodiment of Client Application 100, hereafter referred to as the Embed embodiment.

The recording/publishing experience is designed to be straightforward. Users bring up the Exchange Recorder (FIG. 4, FIG. 5), which consists of a video recorder pane and an adjoining content pane, then record their video and add text, images, links, and other videos into the content pane. When finished, they click the Publish button and the video and associated content are published as a single exchange that can be played back instantly.

Instant playback is achieved by spooling the video as it's being recorded, so that by the time recording is finished and published it is effectively ready to play. In one embodiment, this is accomplished by Video Processor 360 in cooperation with Communications 120, which contains a MediaRecorder element, across Communications Channel 370, which is implemented by Websockets. Once recording has begun by the user via the Exchange Recorder in GUI 145, as soon as video data is available from the MediaRecorder element it is uploaded in chunks to Video Processor 360 via Websockets. When recording stops, Websockets sends a stop signal to Video Processor 360, which then combines the previously received chunks of video data into a single file, converts it to the mp4 format, then transfers the resultant file to Video Store 340. When the transfer finishes, Video Processor 360 informs Communications 120 that the process is complete.

In the Main embodiment of Client Application 100, a plurality of published videos appears in a scrollable grid of Exchange Players that can be sorted and filtered by the user. The Embed embodiment, however, consists only of a single Exchange Player along with the Exchange Recorder 500 shown in FIG. 5. The Main embodiment enables speakers to record host post videos for playback in the Main application grid, as well as publishers of text-based content (e.g., bloggers) to record a host post, embed it in their posts or articles and then publish the two simultaneously. Once published, the single embedded Exchange Player facilitates playback of the author's host post. In both the Main and Embed embodiments, after a video plays through completely a Reply button appears. Clicking the Reply button brings up the appropriate Exchange Recorder. For the Main embodiment, this will be the Main Recorder. For the Embed embodiment, this will be the Embed Recorder.

After watching a video, users are able to rate it, indicating their level of agreement with what was said. In one embodiment, this is done by clicking on an array of 5 heart icons, with 5 representing complete agreement and 1 being disagreement. These ratings are then aggregated by averaging them to measure the level of collective audience agreement (i.e., consensus) with the speaker's post.

Figure 7:
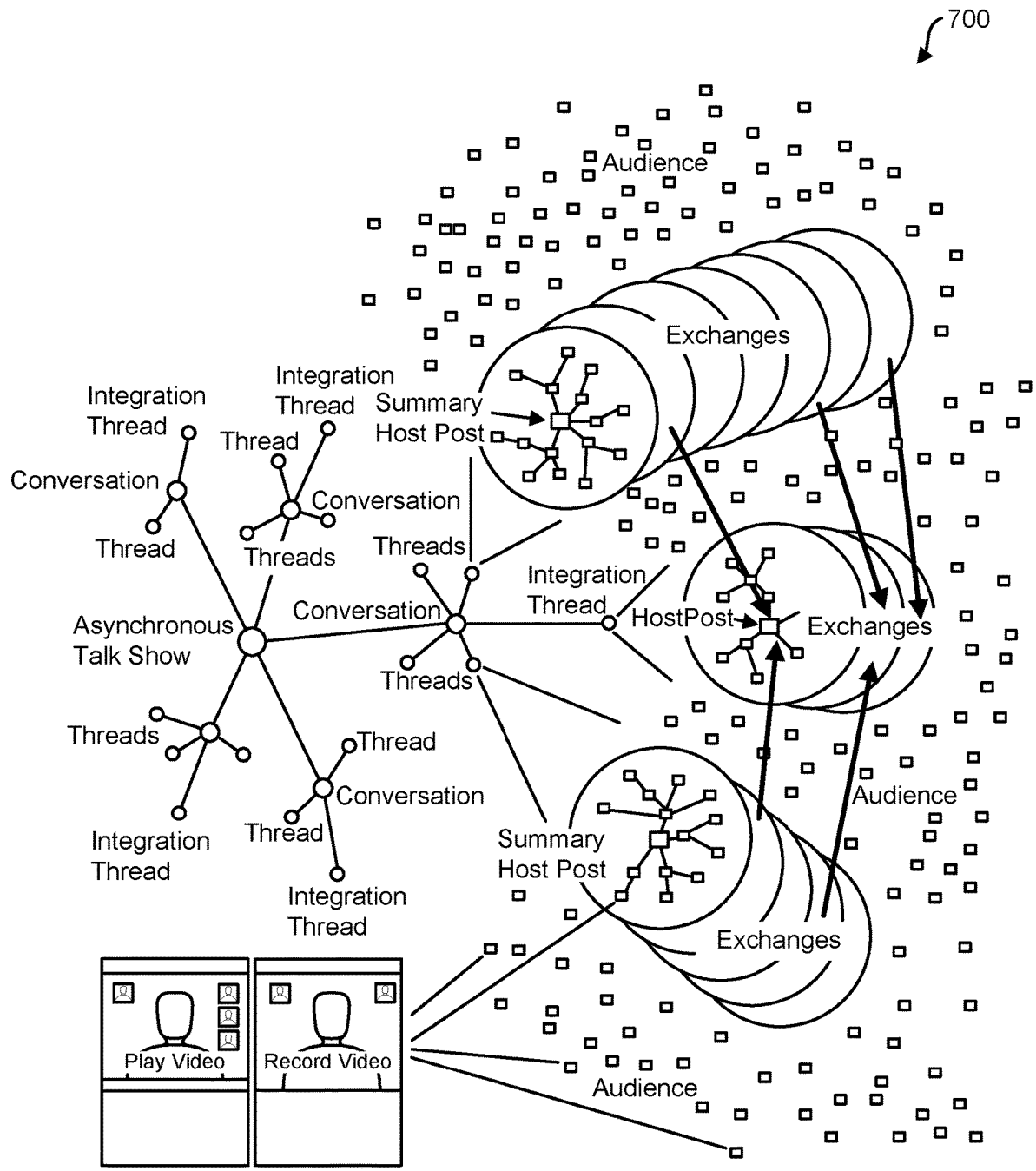
FIG. 7 depicts the distributed system architecture that produces consensus.

FIG. 7 illustrates how the system generates two additional levels of consensus, one through the mechanism of the Summary post type, and another through the mechanism of the Integration thread. The Summary post type operates within a given thread, and is applied to host posts by panelists who are combining high consensus points and statements (i.e., from posts with high levels of agreement) made by themselves and other panelists. Links to referenced posts are added in the associated content pane by the panelist during host post creation and appear in list form for the audience to see after publishing. In this way the audience can refer directly to the posts being summarized by the panelist.

FIG. 7 depicts a classic distributed system consisting of multiple conversations for each asynchronous talk show, and multiple threads for each conversation. Each of these threads in turn consists of a series of exchanges, which are themselves comprised of a tree-like structure of video posts. Each of these posts is produced by an individual panelist equipped with an Exchange Player/Recorder, represented by the small black rectangles in the diagram. Each member of the audience is likewise equipped with an Exchange Player/Recorder, enabling them to post video replies and feed back their level of agreement with what the panelists are saying. Consensus is achieved at the conversation level by means of a special thread called the Integration thread. As shown in FIG. 7, the Integration thread is a series of exchanges designed to aggregate a set of Summary posts from the other threads in a given conversation, synthesizing the highest rated among them into a single narrative. When host posts in these Integration threads receive high levels of agreement from the audience it indicates that a nonpartisan general consensus exists regarding the facts of a conversation and the veracity of its subject matter.

Figure 3:
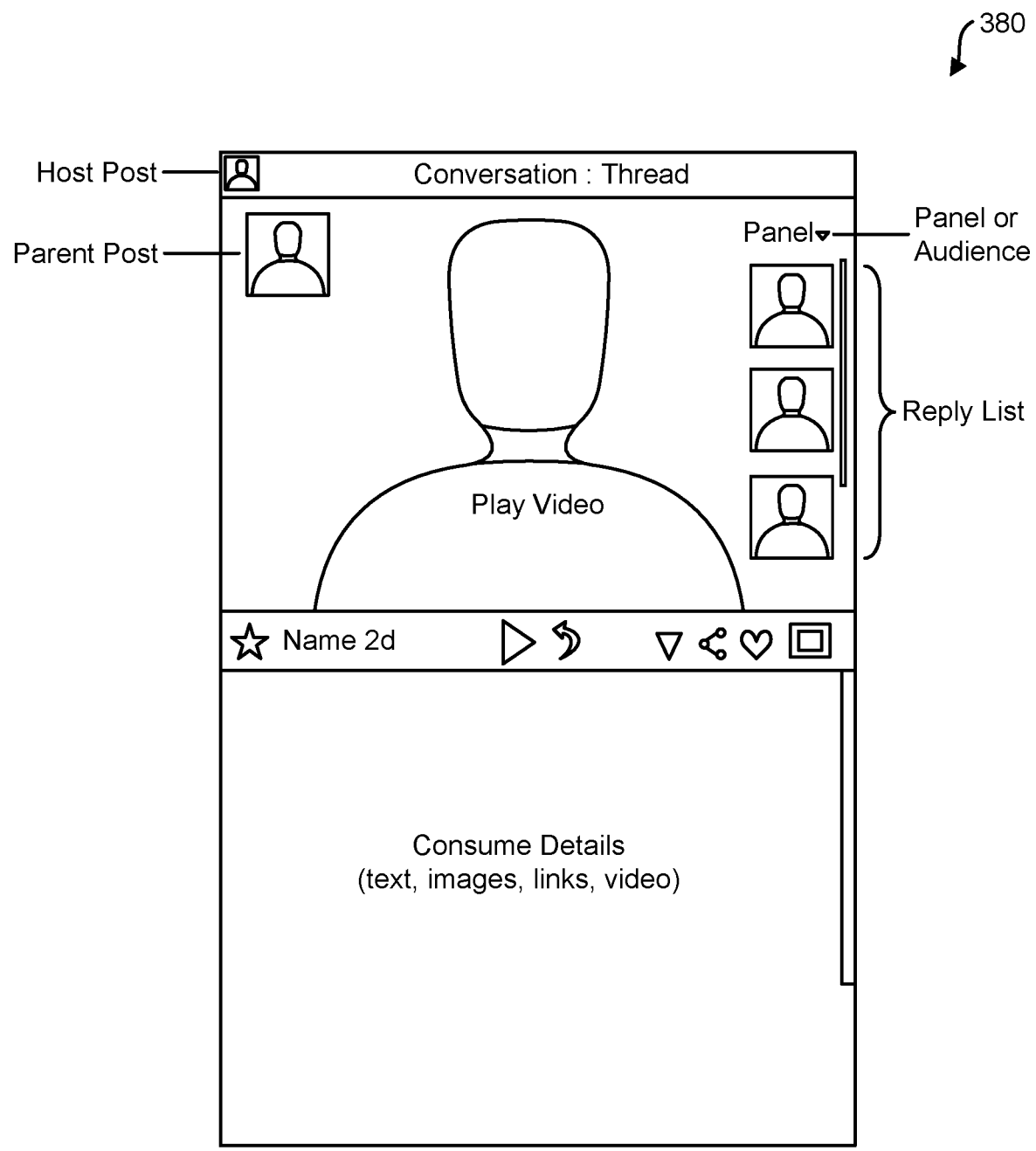
FIG. 3 is an Exchange Player according to an embodiment.

Referring now to the video conversation playback experience, FIG. 3 depicts the Exchange Player. Immediately after a host post is published, the Exchange Player consists only of the host's video and the top and bottom bars. The thumbnails for the host post, the parent post, and the Reply List will not be present, nor will the Reply List selector. In the Main embodiment, the Conversation:Thread identifier will appear in the top bar. If clicked, the user is taken to a thread view for the named thread, which contains a grid of Exchange Players arranged serially, one for each exchange that has taken place between the panelists on that thread. In the Embed embodiment, the Conversation:Thread identifier does not appear in the top bar. In both embodiments, the user is able to play the host post video by clicking the Play button, follow the named panelist by clicking on the Star icon, view the host/panelist's profile by clicking on the displayed Name, view content associated with the video in the Details pane, which displays when the Details icon is clicked, share the exchange by clicking the Share icon, rate the video by clicking the Rate icon, and view the video in full screen by clicking the Full Screen icon.

If replies to the host post have been published the Replies List will be visible. The Replies List is a scrollable list of video thumbnails, each representing a video reply. When the user clicks on a video reply thumbnail, that video becomes the main video in the Exchange Player, and the video which was previously displayed as the main video, called the parent video, is moved to the side of the Exchange Player and displayed as a thumbnail. If the reply video currently displayed as the main video has replies of its own they will now be displayed in the Reply List. If one of these is clicked, it becomes the main video and the previous main reply video is moved to the parent video spot. The previous parent video, which in this example was the host post, is moved to the top bar, where it remains while additional replies are loaded and played. Clicking on the parent video thumbnail restores that video to the main position and updates the parent position, complete with the appropriate Reply List. Clicking on the host post thumbnail restores the Exchange Player to its original state.

Assuming there have been replies from both panelists and the audience, in the default case for the Exchange Player the Reply List selector is set to Panel and the Replies List contains video posts exclusively from panelists, sorted in reverse chronological order. In the alternate view, the Reply List selector is set to Audience and the Replies List contains videos only from the audience. Audience videos can only be replied to by a panelist, the Reply button will not appear if the viewer of the audience video is an audience member. While both panelist and audience posts are rated by the audience, audience posts are sorted so that the highest rated posts bubble up to the top of the Audience Replies List.

There are two ways for audience members to engage with the Panel, automatically and manually. The manual process involves moving a reply from the Audience Replies List to the Panel Replies List whenever the panelist to whom the audience member is replying replies back directly to the audience member. In this case, the audience member is considered a guest, not a panelist. The automatic process is implemented as a chron job whose timing (e.g., every n hours, daily, weekly, etc.) is set by an administrator and involves formally moving an audience member onto the Panel for a given thread, meaning the audience member becomes a full-fledged panelist.

Figure 6:
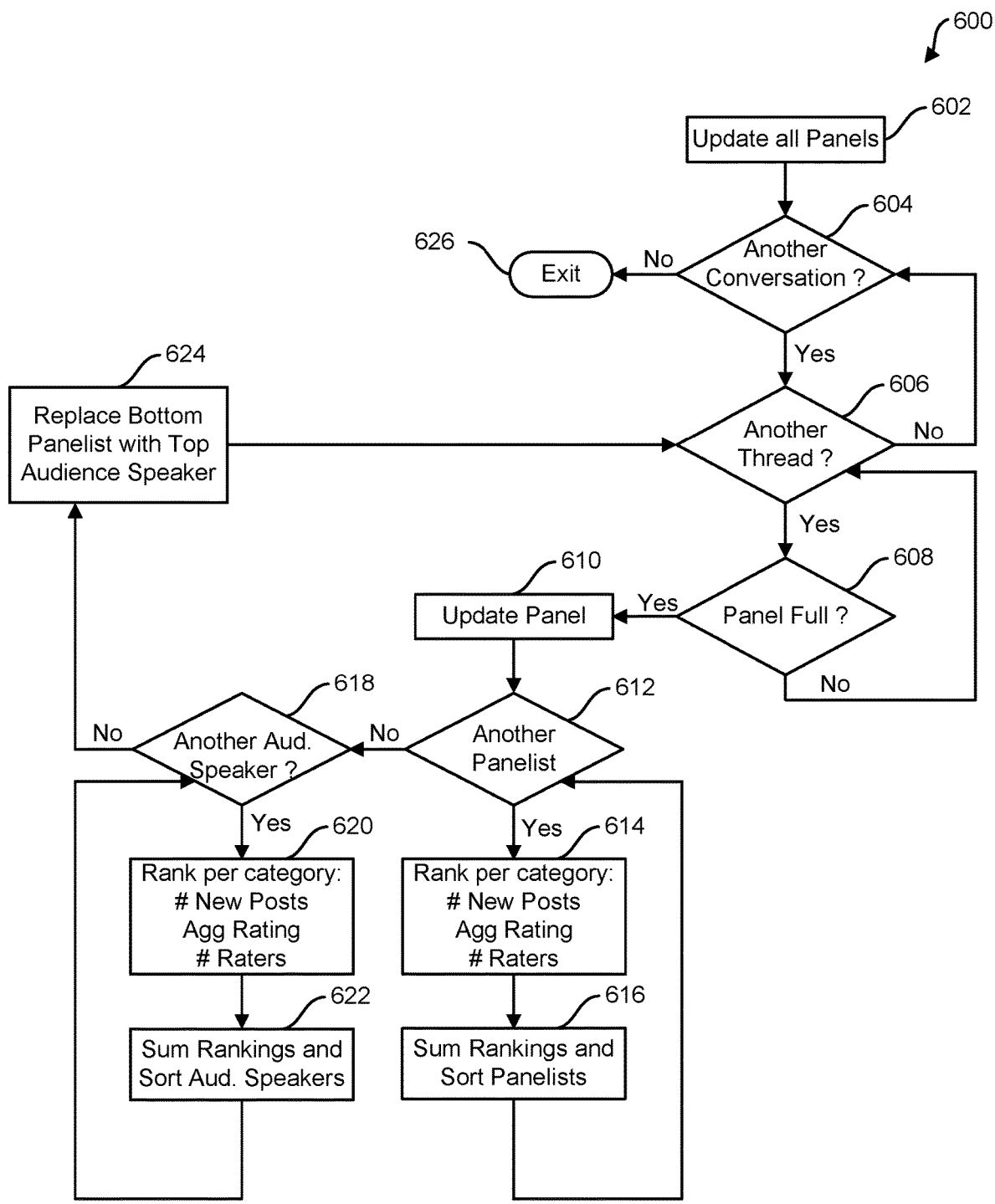
FIG. 6 is a flow chart describing the automatic Panel update process.

FIG. 6 illustrates the automatic process for updating the Panels for all threads in all conversations, although each thread can be assigned its own unique update frequency. In step 602, for each thread/panel to be updated, all panelists and replying audience members on all exchanges for that thread are evaluated. Step 604 decides if another conversation remains to be processed, and, if not, the process is deemed complete and exits. If there is another conversation, step 606 determines if there are remaining threads in that conversation to be processed, and, if not, returns to step 604. If there is an additional thread, step 608 determines if the Panel is full, meaning it has all the panelists it has been allocated by the administrator. If the Panel is not full the process returns to step 606 as updating is unnecessary. If, however, the Panel is full, the process continues to step 610 to update the Panel by performing the following process on each panelist. In step 612 the process determines if there is an additional panelist to process. If so, in step 614 the number of new posts and the aggregate rating and number of raters for all of the panelist's posts are tallied. In step 616 the panelist's tallied results are summed together and added to the list of all panelists for the thread, which is then sorted to provide a ranking of the panelists. Once all the panelists have been evaluated and ranked, step 618 is executed, wherein it is determined whether there is another audience speaker to be evaluated. If so, in step 620 the number of new posts and the aggregate rating and number of raters for all of the speaker's posts are tallied. In step 622 the panelist's tallied results are summed together and added to the list of all audience speakers for the thread, which is then sorted to provide a ranking of the audience speakers. Once all the audience speakers have been evaluated and ranked, in step 624 the bottom ranked panelist is replaced by the top ranked audience speaker, and the process continues at step 606 to proceed to the next thread, if one exists.

The video recording experience is made possible by the Exchange Recorder, which is depicted as Main Recorder 400 in FIG. 4 and Embed Recorder 500 in FIG. 5. For both Main and Embed embodiments the appropriate Exchange Recorder is displayed whenever the Reply button on the Exchange Player is clicked. Recorder 400 is also displayed in the Main embodiment when the Create Host Post button is clicked. On initial display, the user's live image is displayed in the Recorder Pane, as are the Host Post thumbnail (if necessary) and Parent Post thumbnail in the Embed embodiment, along with the Record button. When the Record button is clicked, video recording of the user begins and a Stop button is displayed along with a countdown timer. When either the timer expires or the Stop button is clicked, video recording stops and a Play button appears along with a Re-record button. If Re-record is clicked the Exchange Recorder returns to its original default state. If Play is clicked the just-recorded video plays back.

On Embed Recorder 500, shown in FIG. 5, the Recorder Pane thumbnail is displayed only when either the Host Post or Parent Post thumbnails have been clicked and their respective videos are displayed in the main pane. When this is the case, clicking the Recorder Pane thumbnail returns the Exchange Recorder to its previous state.

For both embodiments of the Exchange Recorder, the Details pane is displayed in a separate pane adjoining the main Recorder pane. The user is able to type or paste in text, edit and format that text, and paste in images, as well as links to webpages and videos. The first two lines of text appearing in the Details pane are displayed on top of the host post video as a means of briefly summarizing the content of the video post.

While the foregoing written description of the invention enables one of ordinary skill to make and use what is considered presently to be the best mode thereof, those of ordinary skill will understand and appreciate the existence of variations, combinations, and equivalents of the specific embodiments, methods, and examples herein. The invention should therefore not be limited by the above described embodiments, methods, and examples, but by all embodiments and methods within the scope and spirit of the invention.

The invention claimed is:

1. A method comprising:
   binding, by an Exchange Player, a set of individual speaker videos created by an Exchange Recorder in an asynchronous talk show format, wherein the set of individual speaker videos comprises an Exchange, and wherein the Exchange is part of a Thread comprising a set of Exchanges, and wherein each Exchange comprises host posts and reply posts and each Thread is a member of a Conversation;
   actively playing a current speaker video for a current user of the Exchange Player;
   displaying, by a user interface of the Exchange Player, a set of replies to the current speaker video as a list of thumbnails sorted in reverse chronological order and overlaying a side of the Exchange Player user interface;
   displaying, by the user interface of the Exchange Player, a parent video of the current speaker video as a thumbnail overlaying the opposite side of the Exchange player user interface from the side displaying the set of replies, wherein clicking on the parent video thumbnail restores the parent video to a main position such that the parent video is the new speaker video;
   offering a host speaker video for the Exchange as a thumbnail overlaying an upper corner of the Exchange Player user interface;
   providing a top bar overlay on the Exchange Player user interface featuring the Conversation and Thread containing the Exchange; and
   providing a bottom bar overlay on the Exchange Player user interface offering speaker video information and additional capabilities; and
   displaying, by the user interface of the Exchange Player, a consensus indicator for each speaker video post, wherein the consensus indicator is an indication of the level of consensus regarding the content of the post that measures the level of collective audience agreement.

* * * * *